United States Patent
Seo et al.

(10) Patent No.: US 10,274,789 B2
(45) Date of Patent: Apr. 30, 2019

(54) LIQUID CRYSTAL DISPLAY AND METHOD FOR MANUFACTURING THE SAME

(71) Applicant: Samsung Display Co., Ltd., Yongin-si, Gyeonggi-do (KR)

(72) Inventors: Yeon Ju Seo, Yongin-si (KR); Young Gu Kang, Hwaseong-si (KR); Yang Hee Kim, Seongnam-si (KR); Eun Je Jang, Seongnam-si (KR); Do Hyun Jung, Cheonan-si (KR); Sung Jin Hong, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 117 days.

(21) Appl. No.: 15/092,911

(22) Filed: Apr. 7, 2016

(65) Prior Publication Data

US 2017/0045773 A1 Feb. 16, 2017

(30) Foreign Application Priority Data

Aug. 11, 2015 (KR) .................. 10-2015-0113166

(51) Int. Cl.
*G02F 1/1339* (2006.01)
*G02F 1/1362* (2006.01)

(52) U.S. Cl.
CPC .... *G02F 1/13394* (2013.01); *G02F 1/136209* (2013.01); *G02F 2001/13396* (2013.01)

(58) Field of Classification Search
None
See application file for complete search history.

(56) References Cited

U.S. PATENT DOCUMENTS

2011/0299004 A1\* 12/2011 Liu .................. H01L 27/1214
349/44

FOREIGN PATENT DOCUMENTS

| JP | 2013-003243 A | | 1/2013 |
|---|---|---|---|
| KR | 10-2008-0034545 | \* | 4/2008 |
| KR | 10-2008-0034545 A | | 4/2008 |

\* cited by examiner

*Primary Examiner* — Ryan Crockett
(74) *Attorney, Agent, or Firm* — Innovation Counsel LLP

(57) ABSTRACT

A liquid crystal display (LCD) is provided, a liquid crystal display comprising: a first substrate and a second substrate that are opposite to each other; a liquid crystal layer arranged between the first substrate and the second substrate; a light blocking pattern including a first light blocking pattern and a second light blocking pattern arranged to extend along one direction on the first substrate; and a column spacer formed on the first light blocking pattern on the first substrate, wherein the light blocking pattern includes an open portion disposed between the first light blocking pattern and the second light blocking pattern, and formed to be spaced apart from the column spacer for a predetermined distance.

8 Claims, 16 Drawing Sheets

LIQUID CRYSTAL DISPLAY AND METHOD FOR MANUFACTURING THE SAME

CROSS-REFERENCE TO RELATED APPLICATIONS

This application is based on and claims priority to Korean Patent Application No. 10-2015-0113166, filed on Aug. 11, 2015 in the Korean Intellectual Property Office, the disclosure of which is incorporated herein in its entirety by reference.

BACKGROUND

1. Field

The present inventive concept relates to a liquid crystal display and a method for manufacturing the same.

2. Description of the Prior Art

In general, a liquid crystal display includes an array substrate, an opposite substrate that is opposite to the array substrate, and a liquid crystal layer interposed between the array substrate and the opposite substrate. Recently, a liquid crystal display having a high transmittance that adopts a COA (Color-filter On Array) substrate, in which color filters are formed on an array substrate, has been developed. In this case, misalignment may occur in the process of combining the COA substrate with the opposite substrate on which a light blocking member is formed, and in order to prevent this misalignment, a BOA (Black matrix On Array) substrate in which the light blocking member is formed on the COA substrate, has been developed. Further, a BCS (Black Column Spacer) for simultaneously forming a light blocking pattern and a column spacer that keeps a gap between the substrates with the same material has been developed.

SUMMARY

The BCS structure has the advantages that the light blocking pattern and the column spacer are simultaneously formed, and thus the processing time, mask cost, and photoresist consumption can be reduced. However, the above-described process of forming the BCS structure generally includes a bake process for curing developed photoresist, and since the light blocking pattern and the column spacer are integrally formed, the photoresist may reflow after the bake process is performed. Accordingly, the shape of the column spacer may be unable to keep the original configuration, but may reflow, and this may cause difficulty in forming the column spacer with a desired height.

Accordingly, one subject to be solved by the present inventive concept is to provide a liquid crystal display which includes a structure that can prevent or suppress deformation of the column spacer due to a reflow phenomenon in a process of simultaneously forming a light blocking pattern and the column spacer, and a method for manufacturing the liquid crystal display.

Additional advantages, subjects, and features of the inventive concept will be set forth in part in the description which follows and in part will become apparent to those having ordinary skill in the art upon examination of the following or may be learned from practice of the inventive concept.

In one aspect of the present inventive concept, there is provided a liquid crystal display comprising: a first substrate and a second substrate that are opposite to each other; a liquid crystal layer arranged between the first substrate and the second substrate; a light blocking pattern including a first light blocking pattern and a second light blocking pattern arranged to extend along one direction on the first substrate; and a column spacer formed on the first light blocking pattern on the first substrate, wherein the light blocking pattern is includes an open portion disposed between the first light blocking pattern and the second light blocking pattern, and formed to be spaced apart from the column spacer for a predetermined distance.

The liquid crystal display may further include a metal layer arranged on a lower portion of the open portion on the first substrate, wherein at least a part of the open portion overlaps the metal layer.

The liquid crystal display may further include a gate wiring arranged on a lower portion of the open portion on the first substrate and including a gate line and a gate electrode, wherein at least a part of the open portion overlaps the gate wiring.

The open portion may overlap a portion of the gate wiring in which the gate electrode is formed.

The first light blocking pattern and the second light blocking pattern may be separated from each other by the open portion.

The open portion may include a first open portion spaced apart from the column spacer to one side for a predetermined distance, and a second open portion spaced apart toward the other side that is an opposite side of the one side for a predetermined distance.

The first light blocking pattern may include an added portion that projects from an edge of the first light blocking pattern corresponding to the column spacer.

The width of the added portion may be from about 9 μm to about 10 μm.

In another aspect of the present inventive concept, there is provided a liquid crystal display comprising: a first substrate and a second substrate that are opposite to each other;
    a liquid crystal layer arranged between the first substrate and the second substrate; a light blocking pattern including a first light blocking pattern and a second light blocking pattern arranged to extend along one direction on the first substrate; and a column spacer formed on the first light blocking pattern on the first substrate, wherein the light blocking pattern includes a third light blocking pattern disposed between the first light blocking pattern and the second light blocking pattern, and formed to be spaced apart from the column spacer for a predetermined distance, and a height of the third light blocking pattern is lower than a height of the first light blocking pattern and a height of the second light blocking pattern.

The liquid crystal display may further includes a metal layer arranged on a lower portion of the third light blocking pattern on the first substrate, wherein at least a part of the third light blocking pattern overlaps the metal layer.

The liquid crystal display may further include a gate wiring arranged on a lower portion of the third light blocking pattern on the first substrate and including a gate line and a gate electrode, wherein at least a part of the third light blocking pattern overlaps the gate wiring.

The third light blocking pattern may overlap a portion of the gate wiring in which the gate electrode is formed.

The third light blocking pattern comprises a portion that is connected to the first light blocking pattern and the second light blocking pattern.

In one another aspect of the present inventive concept, there is provided a method for manufacturing a liquid crystal display, comprising: forming a light blocking layer on a first substrate; and simultaneously forming a light blocking pattern and a column spacer through a process of patterning the light blocking layer using an exposure mask including a light transmission region, a first halftone region, and a light blocking region, wherein the light blocking pattern includes a first light blocking pattern and a second light blocking pattern formed to extend in one direction, and a portion having a reduced thickness than the first light blocking pattern and a second light blocking pattern, the portion having a reduced thickness being formed to be spaced apart from the column spacer between the first light blocking pattern and the second light blocking pattern for a predetermined distance.

The method may further include forming a metal layer on a lower portion of the portion having a reduced thickness on the first substrate, wherein at least a part of the portion having a reduced thickness overlaps the metal layer.

The method may further include forming a gate wiring including a gate line and a gate electrode on a lower portion of the portion having a reduced thickness on the first substrate, wherein at least a part of the open portion overlaps the gate wiring.

The portion having a reduced thickness may overlap a portion of the gate wiring in which the gate electrode is formed.

The portion having a reduced thickness does not have the light blocking layer.

The portion having a reduced thickness may include a first portion spaced apart from the column spacer to one side for a predetermined distance, and a second portion spaced apart toward the other side that is an opposite side of the one side for a predetermined distance.

The first light blocking pattern may include an added portion that projects from an edge of the first light blocking pattern corresponding to the column spacer.

According to the method for manufacturing a liquid crystal display according to an embodiment of the present inventive concept, it is possible to prevent or suppress deformation of the shape of a column spacer due to a reflow phenomenon in a process of simultaneously forming a light blocking pattern and the column spacer.

The liquid crystal display according to an embodiment of the present inventive concept includes a structure that can prevent or suppress deformation of a column spacer due to a reflow phenomenon in a process of simultaneously forming a light blocking pattern and the column spacer, and thus a predetermined step height level of the column spacer can be secured.

The effects according to the present inventive concept are not limited to the contents as exemplified above, but further various effects are included in the description.

BRIEF DESCRIPTION OF THE DRAWINGS

The above and other objects, features and advantages of the present inventive concept will be more apparent from the following detailed description taken in conjunction with the accompanying drawings, in which.

DETAILED DESCRIPTION OF THE EMBODIMENTS

Figure 1:
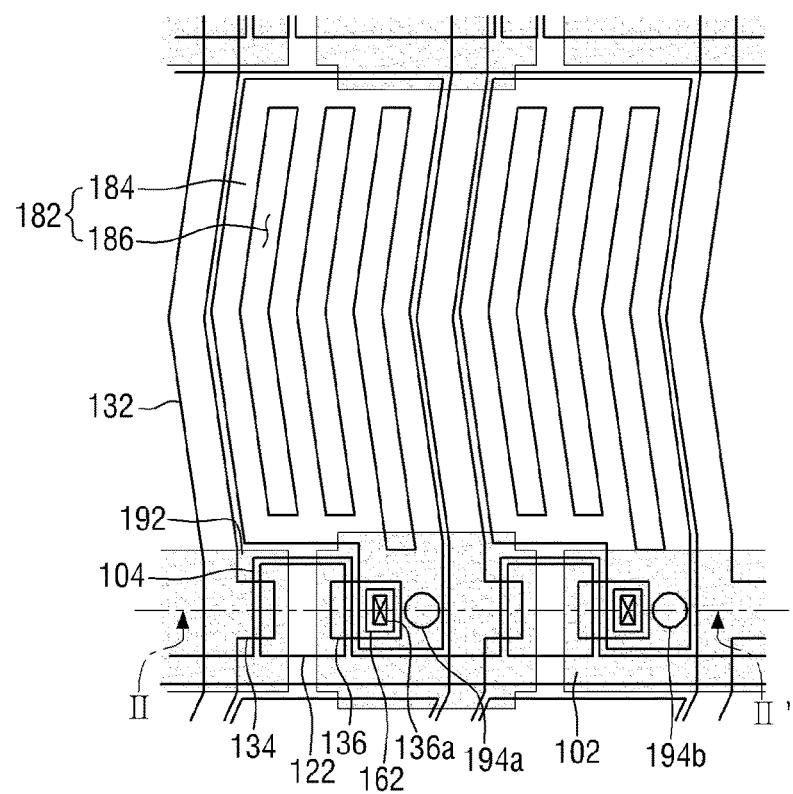
FIG. 1 is a layout diagram of a liquid crystal display according to an embodiment of the present inventive concept.

Reference will now be made in detail to exemplary embodiments, examples of which are illustrated in the accompanying drawings, wherein like reference numerals refer to like elements throughout the specification. In this regard, the present exemplary embodiments may have different forms and should not be construed as being limited to the descriptions set forth herein. Accordingly, the exemplary embodiments are merely described below, by referring to the figures, to explain aspects of the present description.

The description that one element is connected to or coupled to another element includes both cases where the one element is directly connected to the another element and where further another element is interposed between the elements. However, the description that one element is directly connected or directly coupled to another element indicates that there is no further another element between the elements. The term "and/or" includes any and all combinations of one or more of the associated listed items.

A singular expression in the present specification also includes a plural expression. The terms "comprise" and/or "comprising" do not exclude the possibility of existence or addition of one or more other components, steps, operations, and/or devices.

Hereinafter, embodiments of the present inventive concept will be described with reference to the accompanying drawings.

Figure 2:
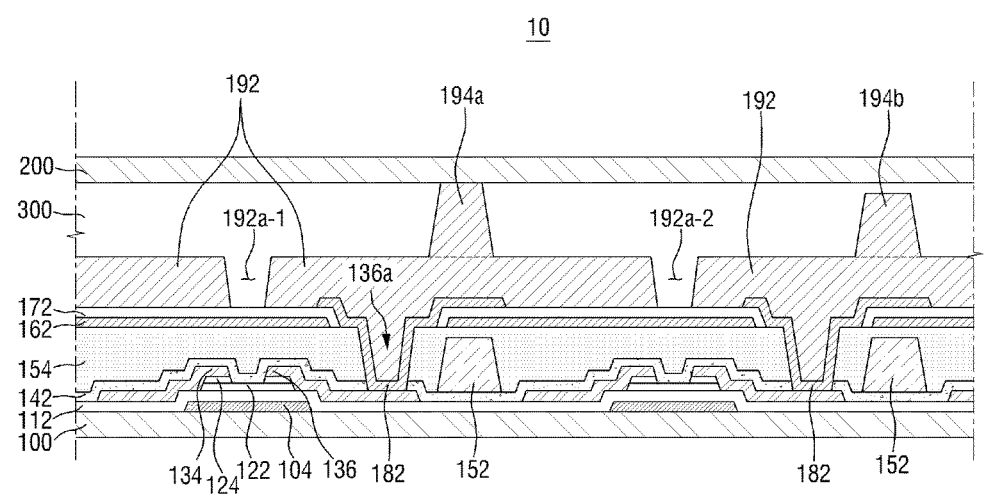
FIG. 2 is a cross-sectional view taken along line III-II' of FIG. 1.
Figure 3:
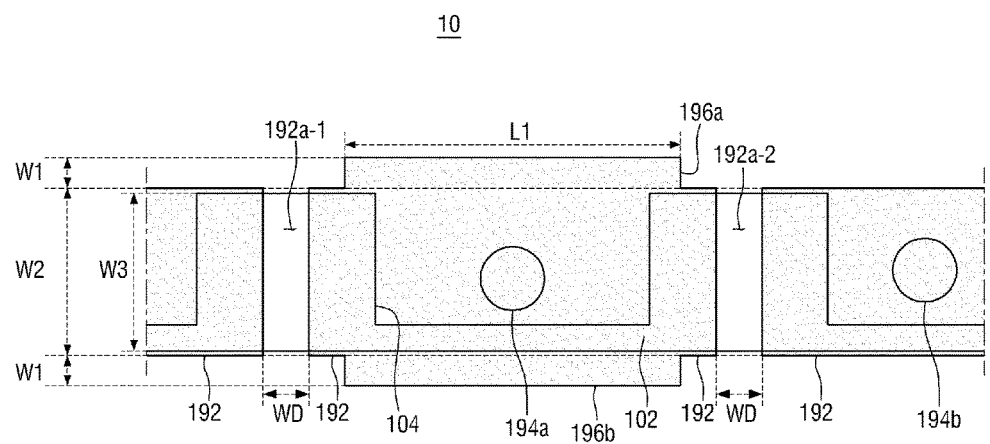
FIG. 3 is a plan view explaining an arrangement between a light blocking pattern and a gate wiring of a liquid crystal display according to an embodiment of the present inventive concept.

FIG. 1 is a layout diagram of a liquid crystal display according to an embodiment of the present inventive concept, and FIG. 2 is a cross-sectional view taken along line II-IF of FIG. 1. FIG. 3 is a plan view explaining an arrangement between a light blocking pattern and a gate wiring of a liquid crystal display according to an embodiment of the present inventive concept.

Referring to FIGS. 1 to 3, a liquid crystal display 10 according to an embodiment of the present inventive concept includes a first substrate 100, a second substrate 200 that is opposite to the first substrate 100, and a liquid crystal layer 300 interposed between the first substrate 100 and the second substrate 200.

The first substrate 100 and the second substrate 200 may include an insulating material, such as transparent glass, quartz, ceramic, silicon, or transparent plastic, and may be properly selected in accordance with a need of a manufacturer. The first substrate 100 and the second substrate 200 may be arranged opposite to each other.

In some embodiments, the first substrate 100 and the second substrate 200 may be flexible substrates. That is, the first substrate 100 and the second substrate 200 may have flexibility, and thus can be, for example, rolled, folded, and/or bended.

On the first substrate 100, a plurality of gate wirings 102 and 104 and data wirings 132, 134, and 136 may be arranged.

The gate wirings 102 and 104 may include a plurality of gate lines 102 and a plurality of gate electrodes 104. The data wirings 132, 134, and 136 may include a plurality of data lines 132, a plurality of source electrodes 134, and a plurality of drain electrodes 136.

The gate wirings 102 and 104 and the data wirings 132, 134, and 136 may be made of an aluminum-based metal, such as aluminum (Al) or an aluminum alloy, a silver-based metal, such as silver (Ag) or a silver alloy, a copper-based metal, such as copper (Cu) or a copper alloy, a molybdenum-based metal, such as molybdenum or a molybdenum alloy, chrome (Cr), titanium (Ti), or tantalum Ta). Further, the gate wirings 102 and 104 and the data wirings 132, 134, and 136 may have a multilayer structure that includes more than two conductive layers (not illustrated) having different physical properties. For example, one conductive layer may be made of an aluminum-based metal, a silver-based metal, or a copper-based metal, and the other conductive layer may be made of refractory metal such as a molybdenum-based metal, titanium, and tantalum. An example of such a combination may be a lower chrome layer and an upper aluminum layer, or a lower aluminum layer and an upper molybdenum layer. However, the present inventive concept is not limited thereto, and the gate wirings 102 and 104 and the data wirings 132, 134, and 136 may be formed of various kinds of metals and conductors.

Each gate line 102 may extend in a first direction, for example, along a boundary of pixels in a horizontal direction, and each data line 132 may extend in a second direction, for example, along a boundary of pixels in a vertical direction. The gate lines 102 and the data lines 132 may be arranged to cross each other and define a pixel region. That is, the pixel region may be defined by a region that is surrounded by the gate lines 102 and the data lines 132.

In some embodiments, the data lines 132 may be periodically bent as illustrated in FIG. 1 to improve transmittance. However, this is merely exemplary, and the shape of the data lines 132 according to the present inventive concept is not limited thereto.

At least one gate electrode 104 is arranged to be connected to each gate line 102 for each pixel. The gate electrode 104 may be branched from the gate line 102 toward a semiconductor layer 122, or may be formed through extension of the gate line 102. However, forming of the gate electrode 104 is not limited thereto, but the gate electrode 104 may be defined in a region in which the gate line 102 overlaps the semiconductor layer 122 on the extended path of the gate line 102.

At least one source electrode 134 is arranged to be connected to each data line 132 for each pixel. The source electrode 134 may be branched from the data line 132 toward the semiconductor layer 122, or may be formed through extension of the data line 132. However, forming of the source electrode 134 is not limited thereto, but the source electrode 134 may be defined in a region in which the data line 132 overlaps the semiconductor layer 122 on the extended path of the data line 132. For example, the source electrode 104 may not project from the data line 132, but may be positioned substantially on the same line as the data line 132. The drain electrode 136 may be arranged to be spaced apart from the source electrode 104 on the semiconductor layer 122, and may be electrically connected to a pixel electrode 182 through a contact hole 136a formed through a first passivation layer 142, an organic layer 154, and a second passivation layer 172.

A gate insulating layer 112 may be arranged between the gate wirings 102 and 104 and the data wirings 132, 134, and 136. In an embodiment, the gate insulating layer 112 may be arranged on the gate wirings 102 and 104, and the data wirings 132, 134, and 136 may be arranged on the gate insulating layer 112. The gate insulating layer 112 may be made of, for example, silicon nitride ($SiN_x$), silicon oxide ($SiO_2$), silicon oxynitride (SiON), or a laminated layer thereof. The gate insulating layer 112 may insulate the gate wirings 102 and 104 from the data lines 132 positioned on upper portions of the gate wirings.

The semiconductor layer 122 may be arranged on the gate insulating layer 112, and may be made of, for example, hydrogenated amorphous silicon or polysilicon. The semiconductor layer 122 is arranged to overlap the gate electrode 104 at least partly. The semiconductor layer 122 forms a thin film transistor together with the gate electrode 104, the source electrode 134, and the drain electrode 136.

The semiconductor layer 122 may have various shapes, and for example, may be of an island type or a line type. FIG. 3 exemplifies that the semiconductor layer 122 is of an island type, but is not limited thereto. In the case where the semiconductor layer 122 is formed of an island type, although not separately illustrated, the semiconductor layer 122 may overlap the data wirings 132, 134, and 136.

On the semiconductor layer 122, a resistive contact layer, which is composed of n+ hydrogenated amorphous silicon that is highly doped with an n-type impurity, may be arranged. The ohmic contact layer 124 is positioned between the lower semiconductor layer 122 and the upper source electrode 134 and drain electrode 136 and serves to reduce contact resistance. In a similar manner to the semiconductor layer 122, the ohmic contact layer 124 may have various shapes, and for example, may be of an island type or a line type. In the case where the semiconductor layer 122 is of an island type, the ohmic contact layer 124 may also be of an island type, whereas in the case where the semiconductor layer 122 is of a line type, the ohmic contact layer 124 may also be of a line type. The ohmic contact layer 124, for example, a source ohmic contact layer and a drain ohmic contact layer, unlike the semiconductor layer 122, may be spaced apart each other with a channel region interposed therebetween, and thus the lower semiconductor layer 122 may be exposed. In the semiconductor layer 122, a channel may be formed in a region in which the source electrode 134 and the drain electrode 136 are spaced apart from each other to face each other.

If a gate-on signal is applied to the gate electrode 104 and a channel is formed in the semiconductor layer 122, the thin film transistor is turned on, and thus the drain electrode 136 can receive a data signal from the source electrode 134 and transfer the received data signal to a pixel electrode 192.

The passivation layer 142 may be arranged on the data wirings 132, 134, and 136 and the exposed semiconductor layer 122. The contact hole 136a that exposes at least a portion of the drain electrode 136 may be formed on the first passivation layer 142 and the organic layer 154 to be described later. At least a portion of the drain electrode 136 that is exposed through the contact hole 136a may come in contact with the pixel electrode 182. Through this, the drain electrode 136 and the pixel electrode 182 may be electrically connected/contacted.

The first passivation layer 142 may include, for example, an inorganic material, such as silicon nitride or silicon oxide, or a material of a-Si:C:O or a-Si:O:F that is formed by PECVD (Plasma Enhanced Chemical Vapor Deposition).

The organic layer 154 may be arranged on the first passivation layer 142. The organic layer 154 has superior planarization characteristics, and may include a material having photosensitivity. The organic layer 154 includes the contact hole 136a that exposes at least a portion of the drain electrode 136.

In some embodiments, a color filter 152 may be arranged between the organic layer 154 and the first passivation layer 142 as illustrated in FIG. 2. The color filter 152 may include an R (Red) color filter, a G (Green) color filter, and a B (Blue) color filter. The R, G, and B color filters are formed on respective pixels to form R, G, and B pixels. The color filter 152 may include a photosensitive organic layer including pigment. On the color filter 152, the organic layer 154 may be arranged to perform planarization of the R, G, and B color filters to remove step heights thereof. The color filter 152 may be covered by the organic layer 154. That is, the color filter 152 may be covered by the organic layer 154 to remove the exposed portion. However, this is merely exemplary, and the present inventive concept is not limited to such a structure as described above.

A common electrode 162 may be arranged on the organic layer 154. The common electrode 162 may receive a common voltage and may control the alignment direction of liquid crystal molecules included in the liquid crystal layer 300 together with a pixel electrode 182 which will be described later. The common electrode 162 includes an opening that exposes a region in which the contact hole 136a is formed. That is, at least a portion of the drain electrode 136 may be exposed through the opening that is formed on the common electrode 162. The common electrode 162 may be integrally formed through the whole pixel region that is surrounded by the gate line 102 and the data line 132 except for the opening. The common electrode 162 may be implemented by a transparent conductive material, such as ITO (Indium Tin Oxide) or IZO (Indium Zinc Oxide), but is not limited thereto.

The second passivation layer 172 may be arranged on the common electrode 162 and the organic layer 154. The second passivation layer 172 may include an opening that exposes a region in which the contact hole 136a is formed. That is, at least a portion of the drain electrode 136 may be exposed through the opening formed on the second passivation layer 172. The second passivation layer 172 may be made of an inorganic insulating material. For example, the second passivation layer 172 may include silicon nitride or silicon oxide. The second passivation layer 172 may be positioned between the pixel electrode 182 and the common electrode 162 to perform insulation between the pixel electrode 182 and the common electrode 162.

The pixel electrode 182 may be arranged on the second passivation layer 172 for each unit pixel. At least a part of the pixel electrode 182 may overlap the common electrode 162. A portion of the pixel electrode 182 is arranged inside the contact hole 136a. A portion of the pixel electrode 182 that is arranged inside the contact hole 136a may come in contact with the drain electrode 136 to be electrically connected to the drain electrode 136.

In some embodiments, the pixel electrode 182 may include a plurality of branch electrodes 184 that overlap the common electrode 162, and a slit 186 may be formed between the neighboring branch electrodes 184. The branch electrodes 184 may be tilted to form an oblique angle against the vertical direction, and may be bent on a horizontal center line (not illustrated) of the pixel electrode 182. Accordingly, the pixel electrode 182 may be divided into a plurality of domains in which the branch electrodes 184 have different tilted directions. For example, on the basis of the horizontal center line, the upper branch electrodes 184 may extend in upper right direction and the lower branch electrodes 184 may extend in lower right direction. The branch electrodes 184 of the pixel electrode 182 may extend substantially in parallel to the data line 132. However, the shape of the pixel electrode 182 illustrated in FIG. 1 is exemplary, and the present inventive concept is not limited thereto. According to a need of a manufacturer, the shape of the slit 186 may be variously selected. For example, the pixel electrode 182 may include a plurality of empty slits 186 having various shapes including a fish-bone shape.

If a data voltage is applied to the pixel electrode 182, an electric field is formed between the pixel electrode 182 and the lower common electrode 162. That is, the pixel electrode 182 may form an electric field together with the common electrode 162 to rotate liquid crystal molecules included in the liquid crystal layer 300. The pixel electrode 182 may include a transparent conductive material, such as ITO or IZO, but is not limited thereto.

In another embodiment, the pixel electrode 182 may have a plate shape. In this case, the common electrode 162 may include a plurality of branch electrodes (not illustrated) that overlap the pixel electrode 182. However, this is exemplary, the structure and the arrangement of the pixel electrode 182 and the common electrode 162 may be variously set.

A light blocking pattern 192 may be arranged on the second passivation layer 172 and the pixel electrode 182. The light blocking pattern 192 serves to prevent light leakage. The light blocking pattern 192 may be arranged in a thin film transistor region and a non-pixel region (between pixels or between the gate line and the data line).

In some embodiments, the light blocking pattern 192 may be implemented to include a shape that extends in the same direction as the extension direction of the gate line 102. The light blocking pattern 192 may be arranged in a region of the gate line 102 and the gate electrode 104. However, this is exemplary, and in another embodiment, the light blocking pattern 192 may be further arranged even in a region of the data line 132 to be implemented in a lattice shape.

In some embodiments, the width W2 of the light blocking pattern 192 may be wider than the width W3 of a region in which the gate electrode 104 among the gate wirings 102 and 104 is formed as illustrated in FIG. 3. However, this is exemplary, and in another embodiment, the width of the light blocking pattern 192 may be equal to or narrower than the width of the region in which the gate electrode 104 among the gate wirings 102 and 104 is formed.

In some embodiments, a part of the light blocking pattern 192 may be arranged in the contact hole 136a as illustrated in FIGS. 1 and 2. However, this is exemplary, and the arrangement of the light blocking pattern 192 is not limited to such a structure.

The light blocking pattern 192 may include a black organic polymer material including black dye or pigment or metal (metal oxide), such as chrome or chrome oxide.

Column spacers 194a and 194b are formed to keep a gap between the first substrate 100 and the second substrate 200, and may include a main column spacer 194a and a sub-column spacer 194b.

An end portion of the main column spacer 194a in the liquid crystal layer 300 may be arranged relatively more adjacent to the second substrate 200 than an end portion of the sub-column spacer 194b. For example, as illustrated in FIG. 2, the end portion of the main column spacer 194a may come in contact with the second substrate 200, and the sub-column spacer 194b may be arranged to be spaced apart from the second substrate 200 for a predetermined distance. Accordingly, a gap between the first substrate 100 and the second substrate 200 may be primarily kept by the main column spacer 194a, and if more pressure is applied to the second substrate, the gap between the first substrate 100 and the second substrate 200 may be secondarily kept by the sub-column spacer 194b.

FIG. 2 exemplifies that the end portion of the main column spacer 194a comes in contact with the second substrate 200, but is not limited thereto. It is also possible that the end portion of the main column spacer 194a is arranged to be spaced apart from the second substrate 200 and is arranged relatively more adjacent to the second substrate 200 than the end portion of the sub-column spacer 194b.

Referring to FIGS. 1 and 2, the column spacers 194a and 194b may be arranged between a thin film transistor of a first pixel and a thin film transistor of a second pixel that is adjacent to the first pixel. At least parts of the column spacers 194a and 194b may overlap the gate wirings 102 and 104 and the data wirings 132, 134, and 136. However, this is exemplary, and the arrangement of the column spacers 194a and 194b is not limited thereto.

In the embodiment of FIGS. 1 to 3, it is exemplified that the main column spacer 194a is arranged in a first pixel region and the sub-column spacer 194b is arranged in a second pixel region that is adjacent to the first pixel. However, the arrangement is not limited thereto, but the liquid crystal display 10 according to an embodiment of the present inventive concept may include pixels in which the column spacers 194a and 194b are not arranged.

On surfaces of the first substrate 100 and the second substrate 200 which contact the liquid crystal layer 300, alignment layers (not illustrated) may be arranged. That is, alignment layers (not illustrated) that can align the liquid crystal layer 300 may be arranged on the pixel electrode 182, the second passivation layer 172, the light blocking pattern 192, and the column spacers 194a and 194b.

Between the first substrate 100 and the second substrate 200, the liquid crystal layer 300 that includes liquid crystal molecules (not illustrated) having positive or negative dielectric anisotropy may be interposed.

In some embodiments, the column spacers 194a and 194b may be made of the same material as the material of the light blocking pattern 192. The column spacers 194a and 194b and the light blocking pattern 192 may be simultaneously formed through one patterning process through halftone mask or slit mask exposure. That is, the column spacers 194a and 194b and the light blocking pattern 192 may be simultaneously formed of the same material. The light blocking pattern 192 may include a portion that is integrally formed with the column spacers.

If it is assumed that a panel is bent by an external force in the case where the light blocking pattern 192 and the column spacers 194a and 194b are simultaneously formed, scratch may occur on an alignment layer PI that is arranged on the second substrate 200 by the column spacers 194a and 194b to cause light leakage.

Accordingly, the light blocking pattern 192 of the liquid crystal display 10 according to an embodiment of the present inventive concept may include added portions 196a and 196b to prevent light leakage due to the above-described scratch. The added portions 196a and 196b may protrude from imaginary lines which connect horizontal edges of the light blocking patterns. The added portions 196a and 196b may protrude from the imaginary lines to an upper direction and a lower direction in regions corresponding to the column spacers 194a and 194b. In other words, the added portions 196a and 196b may be protrusions that are protruded from the imaginary lines toward adjacent pixel areas and are formed on regions corresponding to the column spacers 194a and 194b. The added portions 196a and 196b may be formed on both sides of the column spacers 194a and 194b and protruded toward adjacent pixel areas from the imaginary lines. According to another embodiment, the added portions 196a and 196b may be formed on both sides of the main column spacers 194a only. In other word, the added portions 196a and 196b may not be formed on sides of the sub-column spacers 194b.

The added portions 196a and 196b may be integrally formed with the light blocking pattern 192 at the same time through one patterning process. The added portions 196a and 196b and the light blocking pattern 192 may be formed of the same material. That is, the light blocking pattern 192, the added portions 196a and 196b, and the column spacers 194a and 194b may be integrally formed of the same material through one patterning process.

The arrangement and the size of the added portions 196a and 196b may be properly determined in accordance with arrangement of the light blocking pattern 192 and the column spacers 194a and 194b. For example, referring to FIG. 3, in the case where the column spacers 194a and 194b are arranged in a center portion of the width W2 of the light blocking pattern 192, the added portions 196a and 196b may be implemented by a structure projected/branched from the width W2 to one side and the other side thereof. That is, the added portions 196a and 196b may include a first added portion 196a that projects from the light blocking pattern 192 having width W2 to one side thereof, and a second added portion 196b that projects from the light blocking pattern 192 having width W2 to the other side thereof that is opposite to the one side. The width W1 and the length L1 of the first added portion 196a may be the same as the width W1 and the length L1 of the second added portion 196b. In this case, the width (W2+2W1) of a portion in which the added portions 196a and 196b are formed may be wider than the width W2 of a portion in which the added portions 196a and 196b are not formed by 2W1. However, this is exemplary, any one of the first added portion 196a and the second added portion 196b may be arranged or the first added portion 196a and the second added portion 196b may be arranged with different sizes in accordance with the arrangement between the light blocking pattern 192 and the column spacers 194a and 194b.

In some embodiments, shapes of the added portions 196a and 196b in a plan view may be a rectangular shape as illustrated in FIG. 3. However, this is exemplary, and the shape of the added portions 196a and 196b is not limited thereto, but may be implemented in various shapes, such as a polygon and a circle.

On the other hand, in the case where the column spacers 194a and 194b and the light blocking pattern 192 are simultaneously formed of the same material in a body using a halftone mask, the above-described forming process may generally include a bake process for curing developed photoresist. In this case, since the light blocking pattern 192 and the column spacers 194a and 194b are integrally formed, the photoresist may reflow after the bake process is performed. Accordingly, the shape of the column spacers 194a and 194b may not be maintained as it is formed, but may be deformed, and this may cause difficulty in forming the column spacers 194a and 194b with a desired height.

Accordingly, the liquid crystal display 10 according to an embodiment of the present inventive concept includes open portions 192a-1 and 192a-2 formed in the light blocking pattern 192 which prevent or suppress reflow of the column spacers 194a and 194b. The open portions 192a -1 and 192a-2 can prevent or suppress reflow of the column spacers 194a and 194b toward the light blocking pattern 192 after the bake process is performed due to the step height of the light blocking pattern 192, and through this, it becomes possible to form the column spacers 194a and 194b with a desired height.

For example, referring to FIG. 3, the light blocking pattern 192 may include a first light blocking pattern and a second light blocking pattern having shapes extending in the same direction as the extension direction of the gate wirings 102 and 104. Here, the first light blocking pattern indicates a portion of the light blocking pattern 192, in which the main column spacer 194a is formed on the upper portion thereof, and the second light blocking pattern indicates a portion of the light blocking pattern 192, in which the main column spacer 194a is not formed. The light blocking pattern 192 may include open portions 192a-1 and 192a-2 formed between the first light blocking pattern and the second light blocking pattern. The open portions 192a-1 and 192a-2 may be formed to be spaced apart from the main column spacer 194a for a predetermined distance. However, although the main column spacer 194a is exemplified, substantially the same structure may be applied even to the sub-column spacer 194b.

In some embodiments, the open portions 192a-1 and 192a-2 may include a first open portion 192a-1 and a second open portion 192a-2 as illustrated in FIG. 3. The first open portion 192a-1 may be arranged to be disposed on one side (left side in the drawing) of the main column spacer 194a, and the second open portion 192a-2 may be arranged to be disposed on the other side (that is opposite to the one side and right side in the drawing) of the main column spacer 194a. The first open portion 192a-1 and the second open portion 192a-2 may be arranged to be bilaterally symmetric having a center of the main column spacer 194a as an axis of symmetry. From another view point, the second open portion 192a-2 may be arranged to be spaced toward one side (left side in the drawing) of the sub-column spacer 194b, and the other open portion may be arranged to be spaced toward the other side (that is opposite to the one side and right side in the drawing) of the sub-column spacer 194b. The first open portion 192a-1 and the other open portion may be arranged to be bilaterally symmetric having a center of the sub-column spacer 194b as an axis of symmetry. However, this is exemplary, and the arrangement of the open portions 192a-1 and 192a-2 is not limited thereto.

In some embodiments, the open portions 192a-1 and 192a-2 may be implemented by an open type structure. For example, in the embodiment of FIGS. 2 and 3, the first open portion 192a-1 and the second open portion 192a-2 may be implemented by an open type structure in which inner walls in left and right directions in the drawing are made of the light blocking pattern 192 and inner walls in upper and lower directions in the drawing are opened. In this case, the portion of the light blocking pattern 192 in which the column spacers 194a and 194b are formed on the upper portion thereof (first light blocking pattern) may be implemented to be separated/disconnected from the other portion of the light blocking pattern 192 (second light blocking pattern) through the open portions 192a-1 and 192a-2. In other words, as illustrated in FIG. 3, the portion of the light blocking pattern 192 in which the main column spacer 194a is formed on the upper portion thereof (first light blocking pattern) may be implemented in an island shape by the first opening portion 192a-1 and the second opening portion 192a-2. However, this is exemplary, and even if the open portions 192a-1 and 192a-2 are implemented by the open type structure, they may be implemented only in any one direction, an upper direction or a lower direction, rather than in the upper and lower directions in the drawing.

In some embodiments, the width W2 of the light blocking pattern 192 may be about 26 μm, the width W1 of the added portions 196a and 196b may be about 9.5 μm, the diameter of the column spacers 194a and 194b may be about 10 μm, and the width L1 of the added portions 196a and 196b in the left and right directions in the drawing may be about 45 μm. In this case, the widths WD of the open portions 192a-1 and 192a-2 that are formed on the light blocking pattern 192 may be about 3.5 μm to 4.5 μm. However, such dimensions are exemplary, and the present inventive concept is not limited thereto.

In the embodiment of FIGS. 1 to 3, it is exemplified that the distance between the column spacers 194a and 194b and the open portions 192a-1 and 192a-2 is about a half of the pixel pitch, but is not limited thereto. The distance between the column spacers 194a and 194b and the open portions 192a-1 and 192a-2 may be about the pixel pitch, for example, about 27 μm to 29 μm. In this case, the first light blocking pattern may have a length corresponding to about double the pixel width (a short side of the pixel).

In some embodiments, the open portions 192a-1 and 192a-2 may be implemented in a rectangular shape in a plan view. Specifically, the open portions 192a-1 and 192a-2 may be implemented in a rectangular shape that extends in a projection direction of the gate electrode 104 or an extension direction of the data line 132, that is, in a rectangular shape that extends in the upper and lower directions in the drawing. In other words, the opening portions may be implemented in a rectangular shape that extends in a direction that is vertical to the extension direction of the light blocking pattern 192. However, this is exemplary, and the shape of the open portions 192a-1 and 192a-2 is not limited thereto.

On the other hand, in order to prevent the occurrence of light leakage through the open portions 192a-1 and 192a-2 formed on the light blocking pattern 192, the liquid crystal display 10 according to an embodiment of the present inventive concept may be implemented to include a metal layer that is arranged on lower portions of the open portions 192a-1 and 192a-2 to overlap at least a part of the open portions 192a-1 and 192a-2. For example, the open portions 192a-1 and 192a-2 may be implemented to have a structure that overlaps the gate wirings 102 and 104. Specifically, as illustrated in FIG. 3, the first open portion 192a-1 may be implemented by a structure which overlaps at least partly a portion of the gate wirings 102 and 104 arranged in the first pixel, in which the gate electrode 104 is formed, and the second open portion 192a-2 may be implemented by a structure which overlaps at least partly a portion of the gate wirings 102 and 104 arranged on the second pixel, in which the gate electrode 104 is formed. Like the embodiment of FIG. 3, the open portions 192a-1 and 192a-2 may be implemented to include a portion that does not overlap the gate electrode 104. However, this is merely exemplary, and the implementation of the open portions 192a-1 and 192a-2 is not limited thereto. The open portions 192a-1 and 192a-2 may be implemented to completely overlap the gate wiring 101. Further, a lower metal that overlaps the open portions 192a-1 and 192a-2 is not limited to the gate wirings 101 and 104. The open portions 192a-1 and 192a-2 may be implemented by a structure that overlaps the data wirings 132, 134 and 136, or may be implemented by a structure that overlaps a separate metal layer.

In some embodiments, like the embodiment of FIGS. 1 to 3, the light blocking pattern 102 may be implemented to include a separated/disconnected shape by the open in portions 192a-1 and 192a-2, but is not limited thereto. The light blocking pattern 192 may be implemented in a continuously connected shape through a third light blocking pattern having a height that is lower than the height of the portion of the light blocking pattern 192 (first light blocking pattern), in which the main column spacer 194a is formed on the upper portion thereof and which is arranged in a position corresponding to the open portions 192a-1 and 192a-2, and the height of the portion of the light blocking pattern 192 (second light blocking pattern), in which the main column spacer 194a is not formed.

Figure 4:
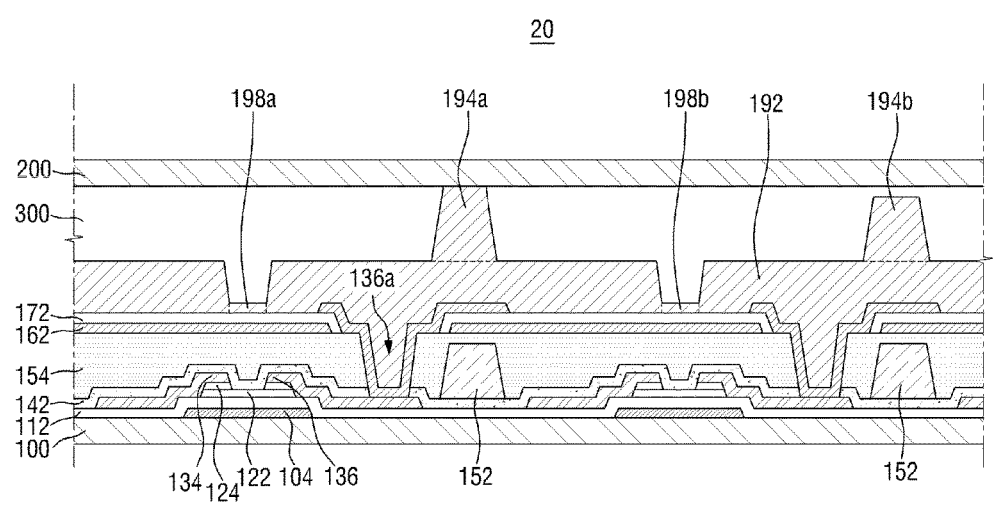
FIG. 4 is a cross-sectional view taken along a line that corresponds to line II-II' of FIG. 1 illustrating a liquid crystal display according to another embodiment of the present inventive concept.
Figure 5:
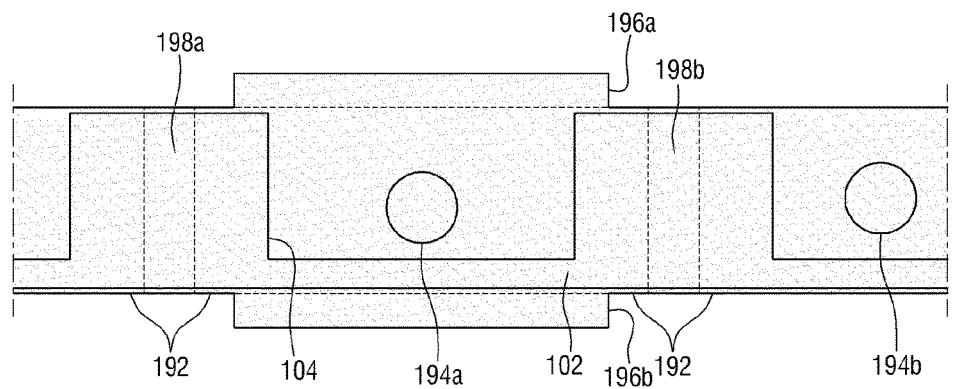
FIG. 5 is a plan view explaining an arrangement between a light blocking pattern and a gate wiring of a liquid crystal display according to another embodiment of the present inventive concept.

FIG. 4 is a cross-sectional view taken along a line that corresponds to line II-II' of FIG. 1 illustrating a liquid crystal display according to another embodiment of the present inventive concept, and FIG. 5 is a plan view explaining an arrangement relationship between a light blocking pattern and a gate wiring of a liquid crystal display according to another embodiment of the present inventive concept.

Referring to FIGS. 4 and 5, a liquid crystal display 20 according to another embodiment of the present inventive concept is different from the liquid crystal display 10 as described above with reference to FIGS. 1 to 3 on that light blocking patterns 198a and 198b have different configurations from those of the liquid crystal display 10, but other configurations are the same as or are similar to those of the liquid crystal display 10 as described above. Hereinafter, explanation will be made about differences except for the duplicate portion.

In this embodiment, the third light blocking patterns 198a and 198b are arranged between the first light blocking pattern and the second light blocking pattern, which extend in the same direction as the extension direction of the gate wirings 102 and 104. Here, the first light blocking pattern indicates a portion of the light blocking pattern 192, in which the main column spacer 194a is formed on the upper portion thereof, and the second light blocking pattern indicates a portion of the light blocking pattern 192, in which the main column spacer 194a is not formed. The height of the third light blocking patterns 198a and 198b is lower than the height of the first and second light blocking patterns. That is, a step may be formed between the first light blocking pattern/the second light blocking pattern and the third light blocking patterns 198a and 198b.

The third light blocking patterns 198a and 198b may be made of the same material as the material of the first light blocking pattern and the second light blocking pattern. The third light blocking patterns 198a and 198b may be integrally formed with the first light blocking pattern and the second light blocking pattern. That is, the third light blocking patterns 198a and 198b may include a portion that is connected to the first light blocking pattern and the second light blocking pattern.

In some embodiments, the third light blocking patterns 198a and 198b may include the (3-1)-th light blocking pattern 198a and the (3-2)-th light blocking pattern 198b. The (3-1)-th light blocking pattern 198a may be arranged to be spaced apart from the main column spacer 194a to one side (left side in the drawing), and the (3-2)-th light blocking pattern 198b may be arranged to be spaced apart from the main column spacer 194a to the other side (opposite to the one side, and right side in the drawing). The (3-1)-th light blocking pattern 198a and the (3-2)-th light blocking pattern 198b may be arranged to be bilaterally symmetric having a center of the main column spacer 194a as an axis of symmetry. From another view point, the (3-2)-th light blocking pattern 198b may be arranged to be spaced apart from the sub-column spacer 194b to one side, and although not illustrated, the other light blocking pattern may be arranged to be spaced apart from the sub-column spacer 194a to the other side. The (3-2)-th light blocking pattern 198b and the other light blocking pattern (not illustrated) may be arranged to be bilaterally symmetric having a center of the sub-column spacer 194b as an axis of symmetry. However, this is exemplary, and the arrangement of the third light blocking patterns 198a and 198b is not limited thereto.

The height of the (3-1)-th light blocking pattern 198a and the (3-2)-th light blocking pattern 198b is lower than the height of the light blocking pattern 192 as illustrated in FIG. 4. That is, the light blocking pattern 192 may include a step that is caused by the (3-1)-th light blocking pattern 198a and the (3-2)-th light blocking pattern 198b. The first light blocking pattern or the second light blocking pattern may be arranged on the left and right sides of the (3-1)-th light blocking pattern 198a and the (3-2)-th light blocking pattern 198b in a plan view, and the light blocking pattern 192 may not be arranged in the upper and lower directions in a plan view.

In the embodiment of FIGS. 4 and 5, the shapes of the (3-1)-th light blocking pattern 198a and the (3-2)-th light blocking pattern 198b may be rectangular in a plan view. However, this is exemplary, and the shapes of the third light blocking patterns 198a and 198b are not limited thereto.

The liquid crystal display 20 according to another embodiment of the present inventive concept may be implemented to include a metal layer that is arranged on lower portions of the third light blocking patterns 198a and 198b to overlap the third light blocking patterns 198a and 198b. For example, the third light blocking patterns 198a and 198b may be implemented by a structure that overlaps the gate wirings 102 and 104. Specifically, as illustrated in FIG. 5, the (3-1)-th light blocking pattern 198a may be implemented by a structure which overlaps at least a portion of the gate wirings 102 and 104 arranged in the first pixel, in which the gate electrode 104 is formed, and the (3-2)-th light blocking pattern 198b may be implemented by a structure which overlaps at least a portion of the gate wirings 102 and 104 arranged on the second pixel, in which the gate electrode 104 is formed. Like the embodiment of FIG. 5, the third light blocking patterns 198a and 198b may be implemented to include a portion that does not overlap the gate electrode 104. However, this is merely exemplary, and a lower metal that overlaps the third light blocking patterns 198a and 198b is not limited to the gate wirings 101 and 104. The third light blocking patterns 198a and 198b may be implemented to completely overlap the gate wiring 101. The third light blocking patterns 198a and 198b may be implemented by a structure that overlaps the data wirings 132, 134 and 136, or may be implemented by a structure that overlaps a separate metal layer.

In this embodiment, reflow of the column spacers 194a and 194b toward the light blocking pattern 192 can be prevented or suppressed after the bake process is performed due to the step height that is caused by the third light blocking patterns 198a and 198b, and through this, it becomes possible to form the column spacers 194a and 194b with a desired height.

In some embodiments, the light blocking pattern 192 may be implemented to include the open type open portions 192a-1 and 192a-2 in the same manner as the embodiment of FIGS. 1 to 3, but is not limited thereto. The light blocking pattern may also be implemented to include closed type open portions.

Figure 6:
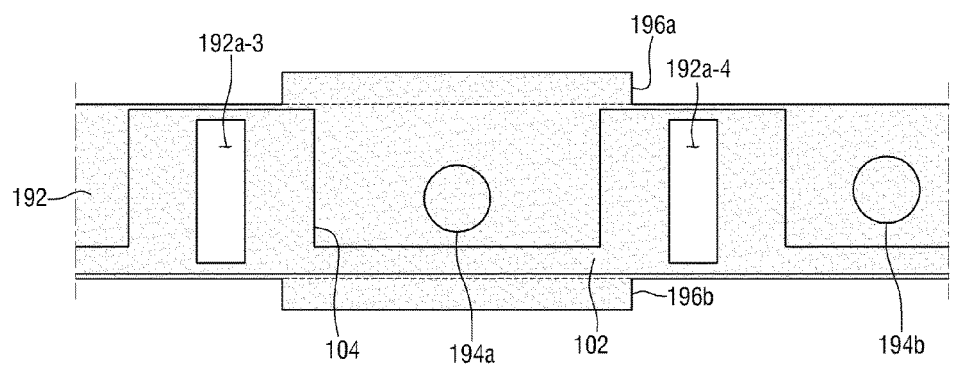
FIGS. 6, 7, 8 and 9 are plan views explaining an arrangement between a light blocking pattern and a gate wiring of a liquid crystal display according to still another embodiment of the present inventive concept.

FIG. 6 is a plan view explaining an arrangement between a light blocking pattern and a gate wiring of a liquid crystal display according to still another embodiment of the present inventive concept.

Referring to FIG. 6, a liquid crystal display 30 according to still another embodiment of the present inventive concept is different from the liquid crystal display 10 as described above with reference to FIGS. 1 to 3 on that open portions 192a-3 and 192a-4 have different configurations from those of the liquid crystal display 10, but other configurations are the same as or are similar to those of the liquid crystal display 10 as described above. Hereinafter, explanation will be made about the differences except for the duplicate portion.

The open portions 192a-3 and 192a-4 of the liquid crystal display 30 according to still another embodiment of the present inventive concept include a first open portion 192a-3 and a second open portion 192a-4. The first open portion 192a-3 may be arranged to be spaced apart from the main column spacer 194a to one side, and the second open portion 192a-4 may be arranged to be spaced apart from the main column spacer 194a to the other side (opposite to the one side). The first open portion 192a-3 and the second open portion 192a-4 may be arranged to be bilaterally symmetric having a center of the main column spacer 194a as an axis of symmetry. From another view point, the second open portion 192a-4 may be arranged to be spaced apart from the sub-column spacer 194b to one side, and although not illustrated, the other open portion may be arranged to be spaced apart from the sub-column spacer 194a to the other side. The second open portion 192a-4 and the other open portion may be arranged to be bilaterally symmetric having a center of the sub-column spacer 194b as an axis of symmetry. However, this is exemplary, and the arrangement of the open portions 192a-3 and 192a-4 is not limited thereto.

On inner walls of the first open portion 192a-3 and the second open portion 192a-4, a light blocking pattern 192 may be arranged. That is, the first open portion 192a-3 and the second open portion 192a-4 may be implemented by a closed structure that is surrounded by the light blocking pattern 192.

In some embodiments, the shapes of the first open portion 192a-3 and the second open portion 192a-4 may be rectangular in a plan view as illustrated in FIG. 6. However, this is exemplary, and the shapes are not limited thereto. In the case where the shapes of the first open portion 192a-3 and the second open portion 192a-4 are implemented to be rectangular, the first open portion 192a-3 and the second open portion 192a-4 may have a closed type open structure in which inner walls in the left, right, upper, and lower directions in a plan view are covered by the light blocking pattern 192. That is, even if the light blocking pattern 102 includes the first open portion 192a-3 and the second open portion 192a-4, it may be implemented in a continuous shape rather than in a disconnected shape.

On the other hand, in order to prevent the occurrence of light leakage through the open portions 192a-3 and 192a-4 formed on the light blocking pattern 192, the liquid crystal display 30 according to still another embodiment of the present inventive concept may be implemented by a structure in which the open portions 192a-3 and 192a-4 and lower metals overlap each other. For example, the open portions 192a-3 and 192a-4 may be implemented by a structure that overlaps the gate wirings 102 and 104. Specifically, as illustrated in FIG. 6, the first open portion 192a-3 may be implemented by a structure that overlaps a portion of the gate wirings 102 and 104 arranged in the first pixel, in which the gate electrode 104 is formed, and the second open portion 192a-4 may be implemented by a structure that overlaps a portion of the gate wirings 102 and 104 arranged on the second pixel, in which the gate electrode 104 is formed. In this case, the open portions 192a-3 and 192a-4 may completely overlap the gate wirings 102 and 104. In other words, the open portions 192a-3 and 192a-4 may be arranged in an inner region of a portion of the gate wirings 102 and 104, in which the gate electrode 104 is formed. In this embodiment, it is exemplified that the lower metals that overlap the open portions 192a-3 and 192a-4 are the gate wirings 102 and 104, but are not limited thereto. The open portions 192a-3 and 192a-4 may be implemented by a structure that overlaps the data wirings 132, 134 and 136, or may be implemented by a structure that overlaps a separate metal layer.

In this embodiment, reflow of the column spacers 194a and 194b toward the light blocking pattern 192 can be prevented or suppressed after the bake process is performed due to the step height that is caused by the closed type open portions 192a-3 and 192a-4 formed on the light blocking pattern 192, and through this, it becomes possible to form the column spacers 194a and 194b with a desired height.

In some embodiments, the light blocking pattern 192 may be implemented to include the closed type open portions 192a-3 and 192a-4 as illustrated in FIG. 6. However, this is exemplary, and the light blocking pattern 192 may be implemented to include a third light blocking pattern having a lower height than the height of the adjacent portions instead of the closed type open portions 192a-3 and 192a-4.

Figure 7:
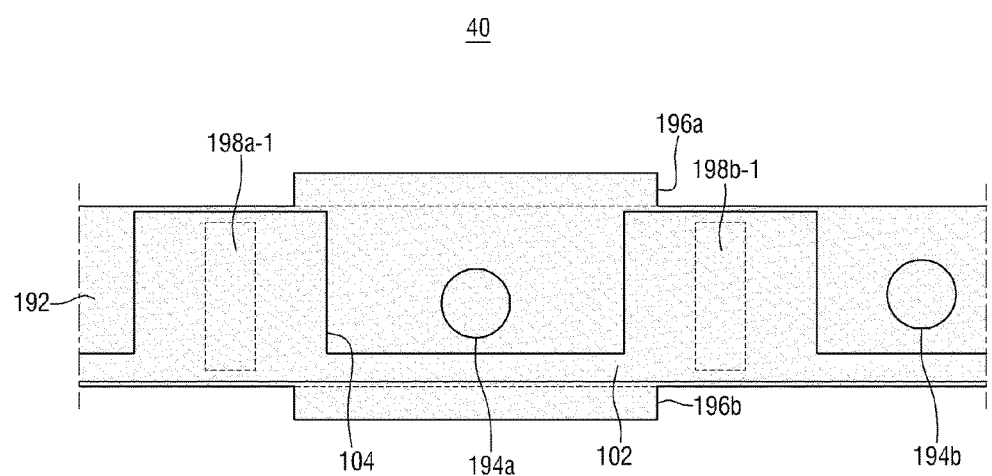

FIG. 7 is a plan view explaining an arrangement between a light blocking pattern and a gate wiring of a liquid crystal display according to still another embodiment of the present inventive concept.

Referring to FIG. 7, a liquid crystal display 40 according to still another embodiment of the present inventive concept is different from the liquid crystal display 30 as described above with reference to FIG. 6 on that third light blocking patterns 198a-1 and 198b-1 have different configurations from those of the liquid crystal display 30, but other configurations are the same as or are similar to those of the liquid crystal display 30 as described above. Hereinafter, explanation will be made about the differences except for the duplicate portion.

The third light blocking patterns 198a-1 and 198b-1 may be formed inside the light blocking pattern 192. The third light blocking patterns 198a-1 and 198b-1 may have a step height that is lower than the step height of the adjacent portions. That is, the third light blocking patterns 198a-1 and 198b-1 may be implemented by a structure that is surrounded by a peripheral portion having a relatively high height.

The third light blocking patterns 198a-1 and 198b-1 are arranged between the first light blocking pattern and the second light blocking pattern, which extend in the same direction as the extension direction of the gate wirings 102 and 104. Here, the first light blocking pattern indicates a portion of the light blocking pattern 192, in which the main column spacer 194a is formed on the upper portion thereof, and the second light blocking pattern indicates a portion of the light blocking pattern 192, in which the main column spacer 194a is not formed.

Referring to FIG. 7, in some embodiments, the first light blocking pattern and the second light blocking pattern may be implemented in a connected shape by the light blocking pattern portions arranged on an upper portion and a lower portion of the third light blocking patterns 198a-1 and 198b-1 in a plan view. However, this is exemplary, and the connected shape of the first light blocking pattern and the second light blocking pattern is not limited thereto.

The third light blocking patterns 198a-1 and 198b-1 may be made of the same material as the material of the first light blocking pattern and the second light blocking pattern. The third light blocking patterns 198a-1 and 198b-1 may be integrally formed with the first light blocking pattern and the second light blocking pattern. In some embodiments, the third light blocking patterns 198a-1 and 198b-1 may include the (3-1)-th light blocking pattern 198a-1 and the (3-2)-th light blocking pattern 198b-1. The (3-1)-th light blocking pattern 198a-1 may be arranged to be spaced apart from the main column spacer 194a to one side, and the (3-2)-th light blocking pattern 198b-1 may be arranged to be spaced apart from the main column spacer 194a to the other side (opposite to the one side). The (3-1)-th light blocking pattern 198a-1 and the (3-2)-th light blocking pattern 198b-1 may be arranged to be bilaterally symmetric having a center of the main column spacer 194a as an axis of symmetry. From another view point, the (3-2)-th light blocking pattern 198b-1 may be arranged to be spaced apart from the sub-column spacer 194b to one side, and although not illustrated, the other light blocking pattern may be arranged to be spaced apart from the sub-column spacer 194a to the other side. The (3-2)-th light blocking pattern 198b-1 and the other light blocking pattern may be arranged to be bilaterally symmetric having a center of the sub-column spacer 194b as an axis of symmetry. However, this is exemplary, and the arrangement of the third light blocking patterns 198a-1 and 198b-1 is not limited thereto.

In some embodiments, the shapes of the (3-1)-th light blocking pattern 198a-1 and the (3-2)-th light blocking pattern 198b-1 may be rectangular in a plan view as illustrated in FIG. 7. However, this is exemplary, and the shapes of the third light blocking patterns 198a-1 and 198b-1 are not limited thereto. The liquid crystal display 40 according to still another embodiment of the present inventive concept may be implemented to include a metal layer that is arranged on lower portions of the third light blocking patterns 198a-1 and 198b-1 to overlap the third light blocking patterns 198a-1 and 198b-1. For example, the third light blocking patterns 198a-1 and 198b-1 may be implemented to overlap the gate wirings 102 and 104. However, this is merely exemplary, and the third light blocking patterns 198a-1 and 198b-1 may be implemented to overlap the data wirings 132, 134 and 136, or may be implemented to overlap a separate metal layer.

In this embodiment, reflow of the column spacers 194a and 194b toward the light blocking pattern 192 can be prevented or suppressed after the bake process is performed due to the step height that is caused by the third light blocking patterns 198a-1 and 198b-1, and through this, it becomes possible to form the column spacers 194a and 194b with a desired height.

In some embodiments, the width W2 of the light blocking pattern 192 in upper and lower directions in a plan view may be wider than the width W3 of the gate wiring of a portion in which the gate electrode 104 is formed as in the embodiment of FIGS. 1 to 3. However, this is exemplary, and the width of the light blocking pattern 192 may be implemented to be substantially equal to the width of the gate wiring of a portion in which the gate electrode 104 is formed.

Figure 8:
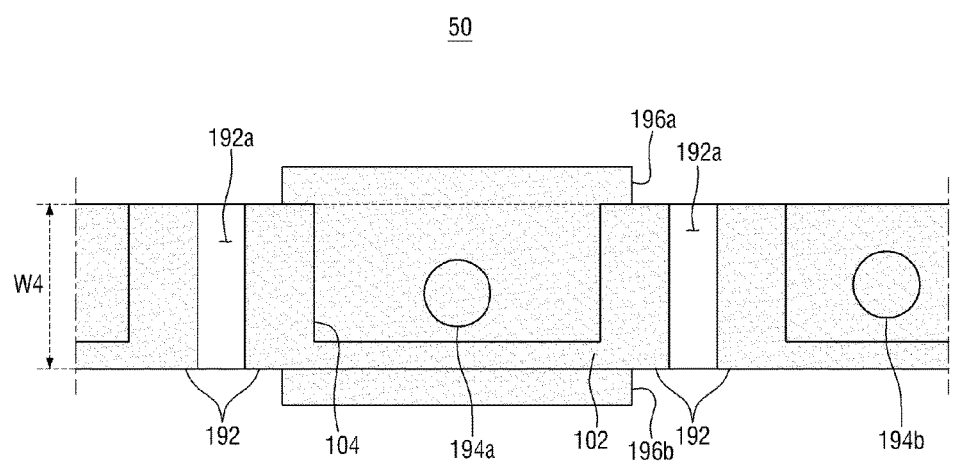

FIG. 8 is a plan view explaining an arrangement between a light blocking pattern and a gate wiring of a liquid crystal display according to still another embodiment of the present inventive concept.

Referring to FIG. 8, a liquid crystal display 50 according to still another embodiment of the present inventive concept is different from the liquid crystal display 10 as described above with reference to FIGS. 1 to 3 on that the light blocking pattern 192 has a different width, but other configurations are the same as or are similar to those of the liquid crystal display 10 as described above. Hereinafter, explanation will be made about the differences except for the duplicate portion.

In some embodiments, the width W4 of the light blocking pattern 192 in upper and lower directions in a plan view may be substantially equal to the width W4 of the gate wiring of a portion in which the gate electrode 104 is formed. Accordingly, as illustrated in FIG. 8, open portions 192a-5 and 192a-6 that are formed on the light blocking pattern 192 may completely overlap a portion of the gate wirings 102 and 104, in which the gate electrode 104 is formed. However, this is exemplary, and the present inventive concept is not limited to such a structure.

In some embodiments, the width W2 of the light blocking pattern 192 in upper and lower directions in a plan view may be wider than the width W3 of the gate wiring of a portion in which the gate electrode 104 is formed as in the embodiment of FIGS. 1 to 3. However, this is exemplary, and the width of the light blocking pattern 192 may be narrower than the width of the gate wiring of the portion in which the gate electrode 104 is formed.

Figure 9:
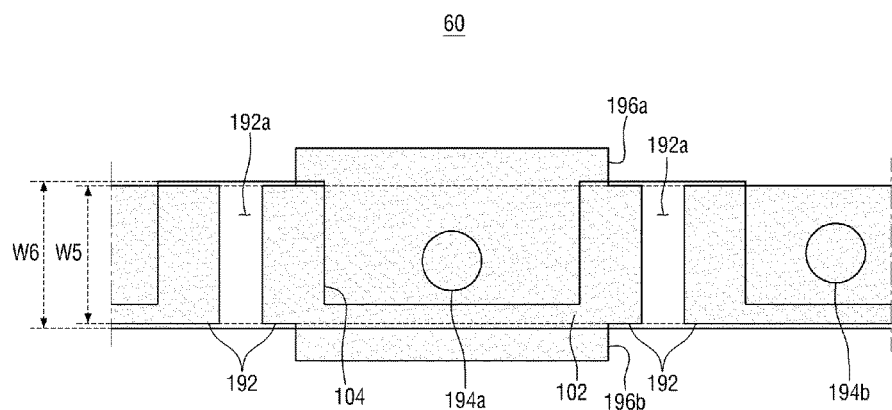

FIG. 9 is a plan view explaining an arrangement relationship between a light blocking pattern and a gate wiring of a liquid crystal display according to still another embodiment of the present inventive concept.

Referring to FIG. 9, a liquid crystal display 60 according to still another embodiment of the present inventive concept is different from the liquid crystal display 10 as described above with reference to FIGS. 1 to 3 on that the light blocking pattern 192 has a different width, but other configurations are the same as or are similar to those of the liquid crystal display 10 as described above. Hereinafter, explanation will be made about the differences except for the duplicate portion.

In some embodiments, the width W5 of the light blocking pattern 192 in upper and lower directions in the drawing may be narrower than the width W6 of the gate wiring of a portion in which the gate electrode 104 is formed. Accordingly, as illustrated in FIG. 9, open portions 192a-1 and 192a-2 that are formed on the light blocking pattern 192 may be arranged on an inner region of the gate wiring region in which the gate electrode 104 is formed. Accordingly, the open portions 192a-1 and 192a-2 may completely overlap a portion of the gate wirings, in which the gate electrode 104 is formed.

Next, a method for manufacturing a liquid crystal display 10 according to an embodiment of the present inventive concept as described above will be described.

FIGS. 10 to 24 are cross-sectional views of processing steps explaining a method for manufacturing a liquid crystal display according to an embodiment of the present inventive concept.

Figure 10:
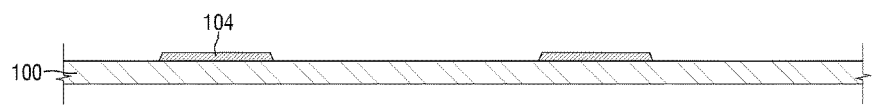
FIGS. 10, 11, 12, 13, 14, 15, 16, 17, 18, 19, 20, 21, 22, 23, 24 and 25 are cross-sectional views of processing steps explaining a method for manufacturing a liquid crystal display according to an embodiment of the present inventive concept.

First, referring to FIGS. 1, 2, and 10, gate wirings 102 and 104 are formed on a first substrate 100.

A first metal layer (not illustrated) is formed on the first substrate 100 that includes glass and quartz. The first metal layer (not illustrated) may be formed of aluminum, copper, silver, molybdenum, chrome, titanium, tantalum, or an alloy thereof, and may include two or more layers having different physical properties. The first metal layer (not illustrated) is deposited, for example, by a sputtering process. Then, the gate wirings 102 and 104 that include a gate line 102 and a gate electrode 104 are formed by patterning the first metal layer (not illustrated) through a photo etching process using an exposure mask. The gate electrode 104 may be branched from the gate line 102 in the form of a projection.

Figure 11:
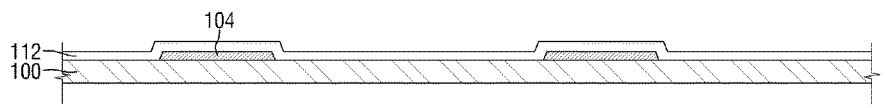

Next, referring to FIG. 11, a gate insulating layer 112 is formed on the gate wirings 102 and 104. The gate insulating layer 112 may be formed through PECVD (Plasma Enhanced Chemical Vapor Deposition), and may include silicon nitride (SiNx) or silicon oxide (SiO2).

Figure 12:
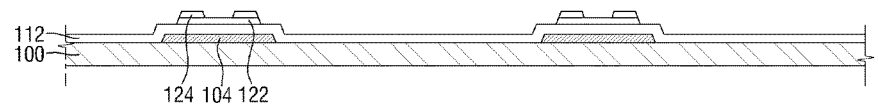

Next, referring to FIG. 12, a semiconductor layer 122 and an ohmic contact layer 124 are formed on the gate insulating layer 112. The semiconductor layer 122 may be formed using hydrogenated amorphous silicon or polysilicon. The semiconductor layer 122 and the ohmic contact layer 124 may be formed through a photo etching process.

Figure 13:
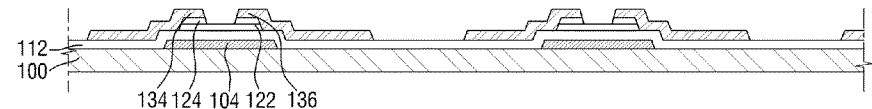

Next, referring to FIGS. 1 and 13, data wirings 132, 134, and 136 that include a data line 132, a source electrode 134, and a drain electrode 136, which define a unit pixel to cross the gate line, are formed on the gate insulating layer 112, the semiconductor layer 122, and the ohmic contact layer 124 through a photo etching process. In the same manner as the gate wirings 102 and 104, the data wirings 132, 134, and 136 may be formed of aluminum, copper, silver, molybdenum, chrome, titanium, tantalum, or an alloy thereof, and may include two or more layers having different physical properties.

In this embodiment, it is exemplified that the semiconductor layer 122 and the ohmic contact layer 124 and the data wirings 132, 134, and 136 are formed through separate photo etching processes, but the forming method are not limited thereto. The semiconductor layer 122, the ohmic contact layer 124, and the data wirings 132, 134, and 136 may be formed through a photo etching process using one mask. In this case, the semiconductor layer 122 and the ohmic contact layer 124 may remain under the data line 132. In other words, the semiconductor layer 122 and the ohmic contact layer may have the same configuration as the data wiring 132, 134 and 136. The semiconductor layer 122 may form a thin film transistor together with the gate electrode 104, the source electrode 134, and the drain electrode 136, and may form a channel.

Figure 14:
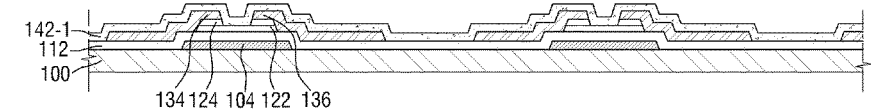

Next, referring to FIG. 14, a first passivation layer 142-1 is formed on the first substrate 102 on which the thin film transistor is formed. The first passivation layer 142-1 may be formed of, for example, an inorganic material, such as silicon nitride or silicon oxide, or a material of a-Si:C:O or a-Si:O:F that is formed by PECVD (Plasma Enhanced Chemical Vapor Deposition).

Figure 15:
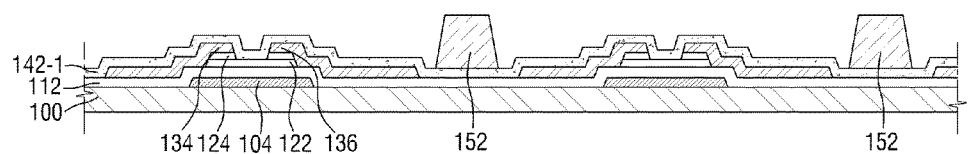

Next, referring to FIG. 15, a color filter 152 is formed on the first passivation layer 142-1. The color filter 152 may be arranged in a pixel region, and may include an R (Red) color filter, a G (Green) color filter, and a B (Blue) color filter. The color filter 152 may be formed of a photosensitive organic material including pigment.

The color filter 152 may be formed by a photo etching process or an inkjet printing method, and other various methods may be applied to form the color filter 152.

Figure 16:
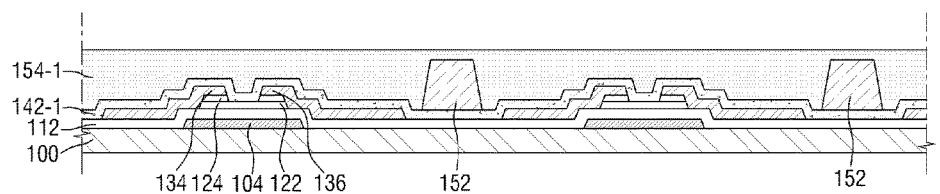

Next, referring to FIG. 16, a first organic layer 154-1 is formed on the first passivation layer 142-1 and the color filter 152. The first organic layer 154-1 has superior planarization characteristics, and may be formed of a material having photosensitivity. The first organic layer 154-1 may be formed by a spin coating method or a slit coating method, or may be formed using both the spin coating method and the slit coating method.

Figure 17:
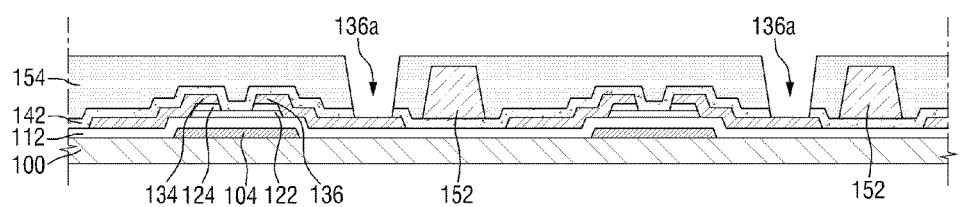

Next, referring to FIG. 17, a contact hole 136a for exposing at least a portion of the drain electrode 136 is formed on the first passivation layer 142-1 and the first organic layer 154-1. Specifically, the contact hole 136a is formed through the first organic layer 154-1, and then the first passivation layer 142 may be removed using the contact hole 136a formed through the first organic layer 154-1 as a etch mask.

Figure 18:
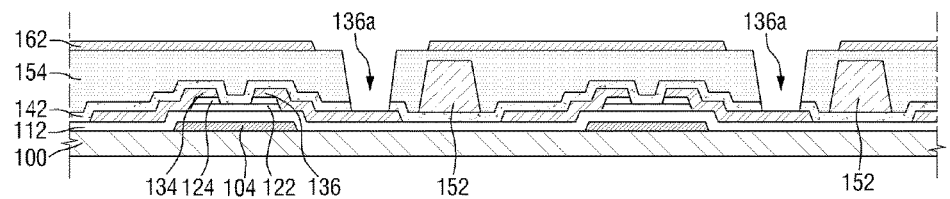

Next, referring to FIG. 18, a common electrode 162 is formed on the organic layer 154. The common electrode 162 may include an opening for exposing a region in which the contact hole 136a is formed. The common electrode 162 may be integrally formed on the whole pixel regions except for the opening. The common electrode 162 may be formed of a transparent conductive material, such as polycrystalline, single crystalline, or amorphous ITO (Indium Tin Oxide) or IZO (Indium Zinc Oxide), but is not limited thereto.

Figure 19:
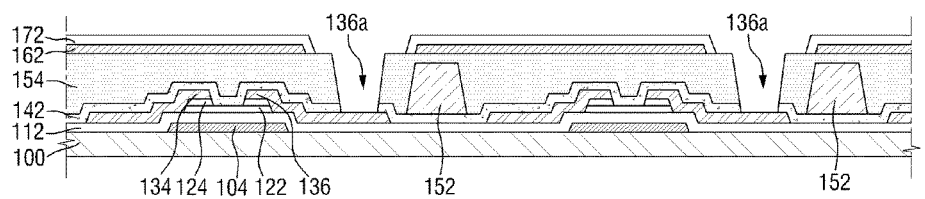

Next, referring to FIG. 19, a second passivation layer 172 is formed on the common electrode 162 and the organic layer 154. The second passivation layer 172 may include an opening for exposing a region in which the contact hole 136a is formed. The second passivation layer 172 may be formed through a process of depositing an inorganic insulating material, for example, silicon nitride or silicon oxide, onto the common electrode 162 and the organic layer 154 and a process of removing the region in which the contact hole 136a is formed using a conventional photolithography technology.

Figure 20:
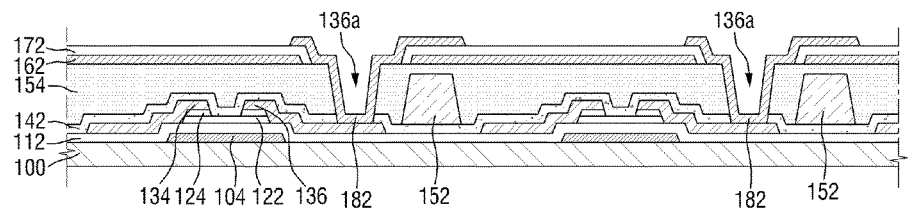

Next, referring to FIG. 20, a pixel electrode 182 is formed on the second passivation layer 172 and the organic layer 154. Specifically, the pixel electrode 182 may be formed to come in contact with at least a portion of the drain electrode 136 that is exposed through the opening formed on the second passivation layer 172 and the contact hole 136a formed on the organic layer 154 and the first passivation layer 142. Through this contact, the pixel electrode 182 may be electrically connected/contacted to the drain electrode 136.

Figure 21:
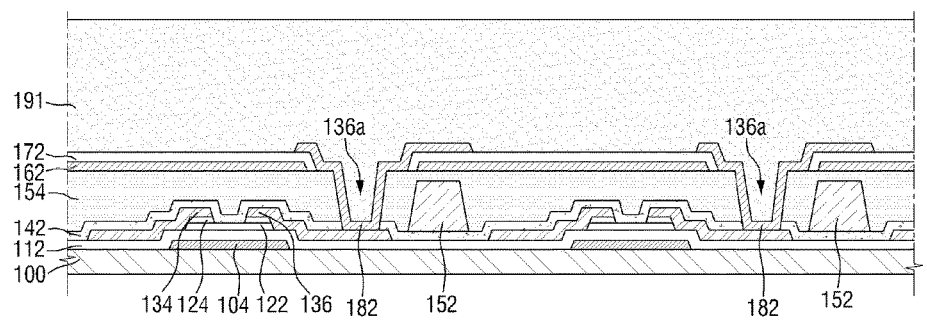

Next, referring to FIG. 21, a light blocking layer 191 is formed on the pixel electrode 182 and the second passivation layer 172. The light blocking layer 191 may include a black organic polymer material including black dye or pigment, or metal (metal oxide), such as chrome or chrome oxide. In this embodiment, it is exemplified that the light blocking layer 191 is made of negative photoresist, but is not limited thereto. The light blocking layer 191 may be implemented by positive photoresist.

Figure 22:
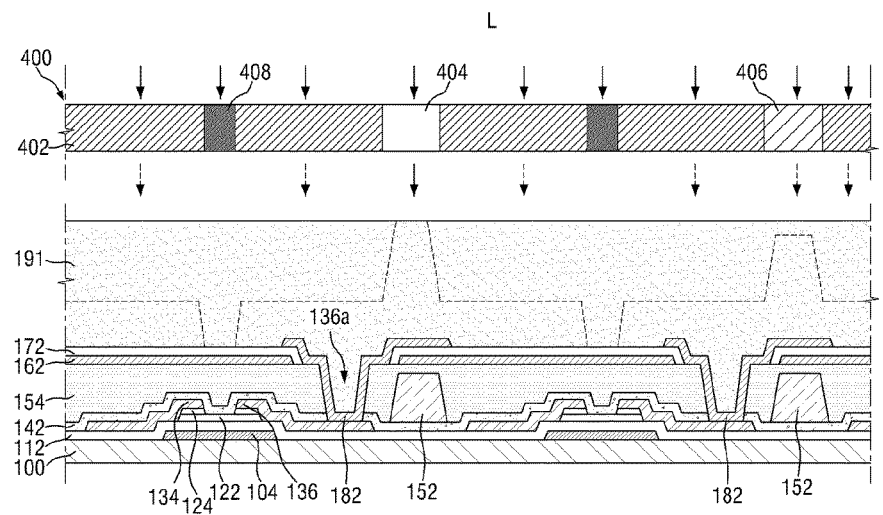
Figure 23:
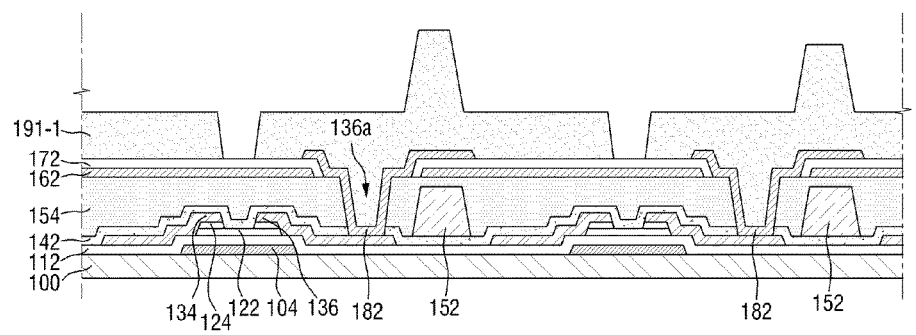

Next, referring to FIGS. 22 and 23, the light blocking layer 191 is exposed and developed using an exposure mask 400. FIG. 22 shows a process of exposing the light blocking layer 191 using the exposure mask 400, and FIG. 23 shows a state where a light blocking layer pattern 191-1 is formed through the exposing and developing of the light blocking layer 101.

The exposure mask 400 may include a first halftone regions 402, a second halftone regions 406, a light transmission regions 404, and a light blocking regions 408. The transmission of irradiated light L becomes high in the order of the light transmission regions 404, the second halftone regions 406, the first halftone regions 402, and the light blocking regions 408. For example, as illustrated in FIG. 22, a part of the irradiated light L may transmit through the first halftone regions 402 and the second halftone regions 406, and the transmission degree of the light L of the first halftone regions 402 may be lower than the transmission degree of the light L of the second halftone regions 406. The whole irradiated light L may transmit through the light transmission regions 404, but is not limited thereto. The whole irradiated light L may be blocked through the light blocking regions 408.

Figure 24:
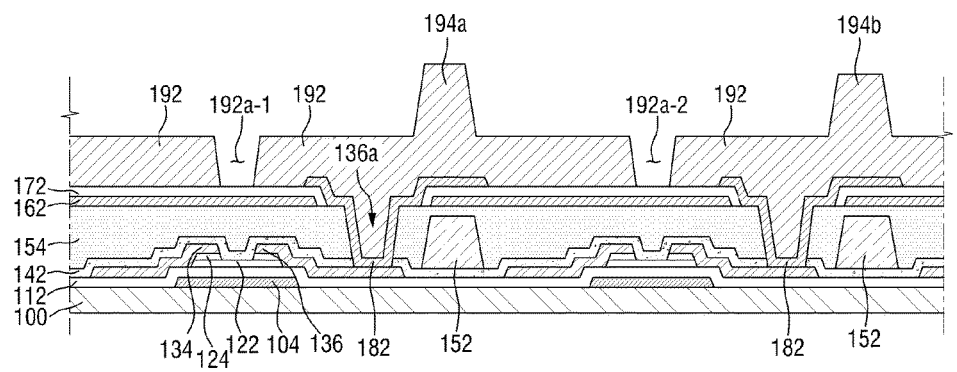

Next, referring to FIGS. 23 and 24, a bake process is performed as a process for curing the light blocking layer pattern 191-1 to form a light blocking pattern 192 and column spacers 194a and 194b. FIG. 24 illustrates a state where the light blocking pattern 192 and the column spacers 194a and 194b are formed through the bake process.

A main column spacer 194a may be formed on a portion of the light blocking layer 191 that corresponds to the light transmission regions 404 on the exposure mask 400. The light blocking pattern 192 may be formed on the portion of the light blocking layer 101 that corresponds to the second halftone regions 406. The portion of the light blocking layer 191 that corresponds to the light blocking regions 408 is a portion to be removed, and through this, open portions 192a-1 and 192a-2 of the light blocking pattern 192 may be formed.

In some embodiments, as can be confirmed through FIGS. 23 and 24, after the bake process is performed, the size of the light blocking layer pattern 191-1 may be somewhat reduced to form column spacers 194a and 194b. However, according to the method for manufacturing the liquid crystal display according to an embodiment of the present inventive concept, since the open portions 192a-1 and 192a-2 are formed in the neighborhood of the column spacers 194a and 194b, reflow of the column spacers 194a and 194b toward the light blocking pattern 192 can be prevented or suppressed, and through this, it becomes possible to secure column spacer step height of a desired level.

Figure 25:
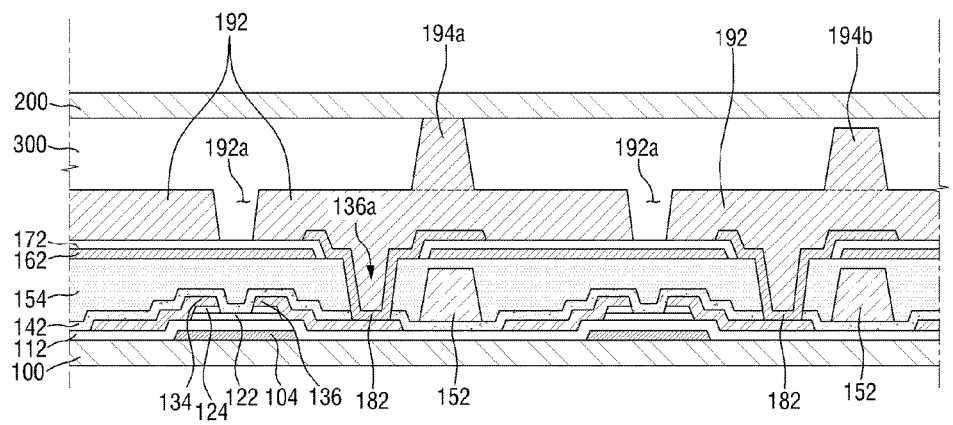

Next, referring to FIG. 25, an alignment layer (not illustrated) is formed on the first substrate 100 and the second substrate 200. Next, a liquid crystal layer 300 is formed by spreading liquid crystal molecules (not illustrated) having positive dielectric anisotropy or negative dielectric anisotropy on the first substrate 100. Next, the first substrate 100 on which the liquid crystal layer 300 is formed is coupled to the second substrate 200.

Next, a method for manufacturing a liquid crystal display 20 according to another embodiment of the present inventive concept as described above will be described.

The method for manufacturing the liquid crystal display 20 according to another embodiment of the present inventive concept is different from the method for manufacturing the liquid crystal display 10 according to an embodiment of the present inventive concept as described above through FIGS. 10 to 25 on the point that a process of patterning a light blocking layer 191 is different from that according to an embodiment of the present inventive concept, but other processes are the same as or are similar to those according to an embodiment of the present inventive concept as described above. Hereinafter, explanation will be made about the differences except for the duplicate portion.

Figure 26:
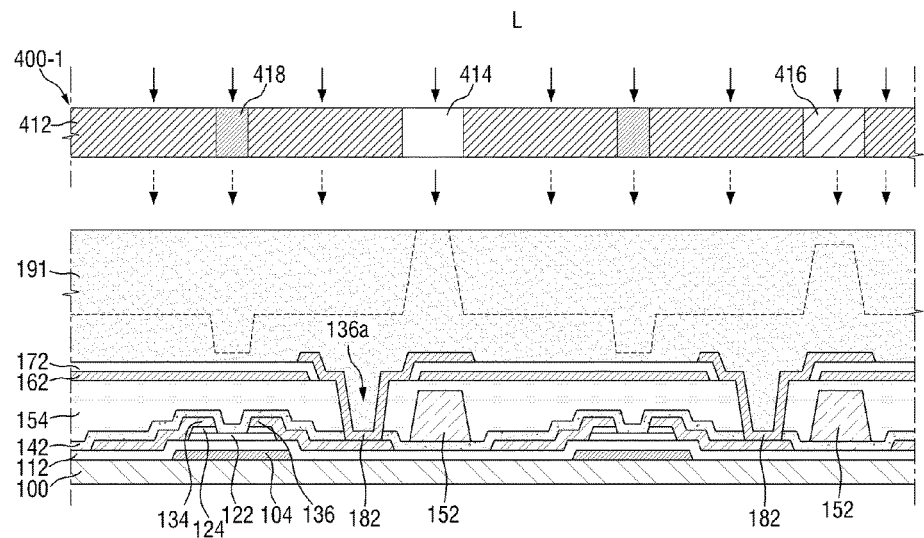
FIG. 26 is a cross-sectional view explaining a process of forming a light blocking pattern and a column spacer in a method for manufacturing a liquid crystal display according to an embodiment of the present inventive concept.

FIG. 26 is a cross-sectional view explaining a process of forming a light blocking pattern and a column spacer in a method for manufacturing a liquid crystal display according to an embodiment of the present inventive concept.

Referring to FIG. 26, in the method for manufacturing the liquid crystal display according to another embodiment of the present inventive concept, a light blocking layer 191 is formed on a pixel electrode 182 and a second passivation layer 172, and then the light blocking layer 191 is patterned through a photo etching process using an exposure mask 400-1. The exposure mask 400-1 may include a first halftone regions 412, a second halftone regions 416, a third halftone regions 418, and a light transmission regions 414.

The transmission of irradiated light L becomes high in the order of the light transmission regions 414, the second halftone regions 416, the first halftone regions 412, and the third halftone regions 418. For example, as illustrated in FIG. 26, a part of the irradiated light L may transmit through the first halftone regions 412, the second halftone regions 416, and the third halftone regions 418, and the transmission degree of the light L may become high in the order of the second halftone regions 416, the first halftone regions 412, and the third halftone regions 418. The whole irradiated light L may transmit through the light transmission regions 414, but is not limited thereto.

Referring to FIGS. 26 and 4, a main column spacer 194a on a portion of the light blocking layer 191 that corresponds to the light transmission regions 414 through a photo etching process using the exposure mask 400-1. The light blocking pattern 192a may be formed on the portion of the light blocking layer 191 that corresponds to the first halftone regions 412. A sub-column spacer 194b may be formed on the portion of the light blocking layer 191 that corresponds to the second halftone regions 416. Third light blocking patterns 198a and 198b may be formed on the portion of the light blocking layer 191 that corresponds to the third halftone regions 418.

Although preferred embodiments of the present inventive concept have been described for illustrative purposes, those skilled in the art will appreciate that various modifications, additions and substitutions are possible, without departing from the scope and spirit of the inventive concept as disclosed in the accompanying claims.

What is claimed is:
1. A liquid crystal display comprising:
  a first substrate and a second substrate that are opposite to each other;
  a liquid crystal layer arranged between the first substrate and the second substrate;
  a color filter disposed on the first substrate;
  a light blocking pattern including a first light blocking pattern and a second light blocking pattern arranged along one direction in which the gate wiring extends; and
  a column spacer formed on the first light blocking pattern on the first substrate,
  wherein the light blocking pattern includes an open portion disposed between the first light blocking pattern and the second light blocking pattern, and formed to be spaced apart from the column spacer for a predetermined distance, and wherein the column spacer completely overlaps the color filter.

2. The liquid crystal display of claim 1, further comprising a metal layer arranged on a lower portion of the open portion on the first substrate, wherein at least a part of the open portion overlaps the metal layer.

3. The liquid crystal display of claim 1, further comprising a gate wiring arranged on a lower portion of the open portion on the first substrate and including a gate line and a gate electrode, wherein at least a part of the open portion overlaps the gate wiring.

4. The liquid crystal display of claim 3, wherein the open portion overlaps a portion of the gate wiring in which the gate electrode is formed.

5. The liquid crystal display of claim 1, wherein the first light blocking pattern and the second light blocking pattern are separated from each other by the open portion.

6. The liquid crystal display of claim 1, wherein the open portion comprises a first open portion spaced apart from the column spacer to one side for a predetermined distance, and a second open portion spaced apart toward the other side that is an opposite side of the one side for a predetermined distance.

7. The liquid crystal display of claim 1, wherein the first light blocking pattern comprises an added portion that projects from an edge of the first light blocking pattern corresponding to the column spacer.

8. The liquid crystal display of claim 1, wherein a width of the added portion is from about 9 μm to about 10 μm.

* * * * *